United States Patent
Ikeda et al.

(10) Patent No.: US 7,325,931 B2
(45) Date of Patent: Feb. 5, 2008

(54) PROJECTION TYPE VIDEO DISPLAY

(75) Inventors: Takashi Ikeda, Osaka (JP); Kenji Tateishi, Osaka (JP); Toshikatsu Umaba, Osaka (JP); Atsuki Terabe, Osaka (JP); Johji Ikeda, Osaka (JP)

(73) Assignees: Sanyo Electric Co., Ltd., Osaka (JP); Sakai Chemical Industry Co., Ltd., Osaka (JP)

( * ) Notice: Subject to any disclaimer, the term of this patent is extended or adjusted under 35 U.S.C. 154(b) by 253 days.

(21) Appl. No.: 11/087,736

(22) Filed: Mar. 24, 2005

(65) Prior Publication Data

US 2005/0213048 A1  Sep. 29, 2005

(30) Foreign Application Priority Data

Mar. 26, 2004  (JP) .............................. 2004-090933

(51) Int. Cl.
*G03B 21/16* (2006.01)
(52) U.S. Cl. ........................... 353/61; 353/57; 348/748
(58) Field of Classification Search .................. 353/52, 353/55–58, 60, 61, 119; 348/748
See application file for complete search history.

(56) References Cited

U.S. PATENT DOCUMENTS

| | | | | |
|---|---|---|---|---|
| 4,516,991 A | * | 5/1985 | Kawashima | .................. 96/55 |
| 4,789,801 A | * | 12/1988 | Lee | ............................. 310/308 |
| 5,951,136 A | * | 9/1999 | Furuhata et al. | .............. 353/31 |
| 6,056,405 A | * | 5/2000 | Heintz et al. | ................. 353/85 |
| 7,008,180 B2 | * | 3/2006 | Fujimori et al. | ......... 415/121.2 |
| 2004/0007000 A1 | * | 1/2004 | Takeda et al. | ................. 62/78 |
| 2004/0175318 A1 | * | 9/2004 | Segawa et al. | ............. 423/247 |

FOREIGN PATENT DOCUMENTS

| | | | | |
|---|---|---|---|---|
| JP | 2001-68293 | * | 3/2001 | ........................ 3/4 |
| JP | 2001-222065 | | 8/2001 | |
| JP | 2004-191767 | | 7/2004 | |

* cited by examiner

*Primary Examiner*—Andrew T Sever
(74) *Attorney, Agent, or Firm*—McDermott Will & Emery LLP

(57) ABSTRACT

An ion wind generator is provided at the back of a light source. The ion wind generator negatively ionizes air by corona discharges using negative-side needle electrodes and draws the negatively-ionized air to a ground-side mesh electrode to allow an airflow to be occurred. A photocatalyst filter is provided at the back of the ion wind generator. Even if ozone ($O_3$) is generated and a lower fatty acid is composed by the ozone and alcohol remained in a casing, the lower fatty acid is decomposed into alcohol and oxygen by the photocatalyst filter.

9 Claims, 3 Drawing Sheets

PROJECTION TYPE VIDEO DISPLAY

BACKGROUND OF THE INVENTION

Field of the Invention

The present invention relates to a projection type video display such as a liquid crystal projector, and the like.

A projection type video display is so configured that light emitted from a light source is modulated by a light valve such as a liquid crystal panel, and the like, and projected, so that it is necessary to comprise a high-luminance light source. Consequently, measures to prevent heat generated from the high-luminance light source itself and heat generated when light is absorbed in a light polarizing plate in the liquid crystal panel or various types of optical components are required. Conventionally, a projection type video display has a structure in which air is taken in and exhausted, and the heat is released from a casing by rotating a fan with a motor (see Japanese Patent Laying-open No. 2001-222065).

SUMMARY OF THE INVENTION

However, in a suction and exhaust mechanism using motor driving, noises are produced due to suction and exhaust sound by rotating sound of a motor and hissing sound of a fan. As a result, there is a disadvantage that the noise produced by the suction and exhaust sound is offensive to the ear when a projector is used.

Therefore, the applicant of the present invention precedently filed an application of a projection type video display equipped with an ion wind generator (Japanese Patent Publication No. 2002-361140). The ion wind generator, as shown in FIG. 4, is so configured as to negatively ionize air by corona discharges using a multiplicity of negative-side needle electrodes 21 and draws the negatively-ionized air to a ground-side mesh electrode 22 to produce an airflow. The ion wind generator 20 is provided at the back of a light source (lamp) 1. When the airflow generated by the ion wind generator 20 is exhausted out of a casing, ambient air heated to high temperature by the heat produced by the light source 1 is drawn and exhausted out of the casing on the airflow. An ozone decomposition catalyst filter 23 is provided in an exhaust port at a rear of the casing. Ozone ($O_3$) is generated by corona discharges in the ion wind generator 20. The ozone is guided out of the casing on the airflow, and decomposed by passing through the ozone decomposition catalyst filter 23 provided in the exhaust port.

However, there is a drawback that alcohol remained in the casing of the video display is oxidized by an unremoved ozone and changed into a lower fatty acid, resulting in giving out abnormal odor.

In view of foregoing circumstances, it is an object of the present invention to provide a projection type video display that uses an ion wind generator as a cooling device, and is capable of minimizing the abnormal odor caused by a generation of the lower fatty acid.

In order to solve the above-mentioned problem, a projection type video display of the present invention is a projection type video display that modulates light emitted from a light source by a light valve and projects the modulated light, and comprises a wind blower for generating an airflow by ionizing, air and molecules in the air by an electrode on one side and drawing ions generated by an ionization by an electrode on the other side, and a catalyst filter for removing, by having a plurality of vent portions, a lower fatty acid in the airflow that passes through the vent portions.

With the above-described configuration, the wind blower generates airflow by electrically moving an ionized air, and so forth. As a result, unlike blowing by the rotation of a fan, no rotation noise is produced, so that, when air is taken in or exhausted, an almost soundless state is made possible. Moreover, even if ozone is generated by the ionization and further the lower fatty acid is generated by the ozone, the lower fatty acid is removed by a catalyst filter, so that it is possible to minimize abnormal odor.

It is desirable that the wind blower and the catalyst filter are arranged at the back of the light source. Furthermore, it is desirable that the catalyst filter is arranged such that the vent portions thereof are oblique to a direction of light that leaks from a rear side of the light source and advances to an exhaust port or a suction port. The catalyst filter may be formed such that a catalyst for removing the lower fatty acid, and an ozone removal element are attached, by being mixed or being divided into areas, to an inner wall of the vent portions of a filter body. The projection type video display may be provided with an ozone removal filter and the ozone removal filter may be arranged at the back of the catalyst filter arranged at the back of the light source.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Hereinafter, a projection type video display of the present invention will be described referring to FIGS. 1 to 3.

Figure 1:
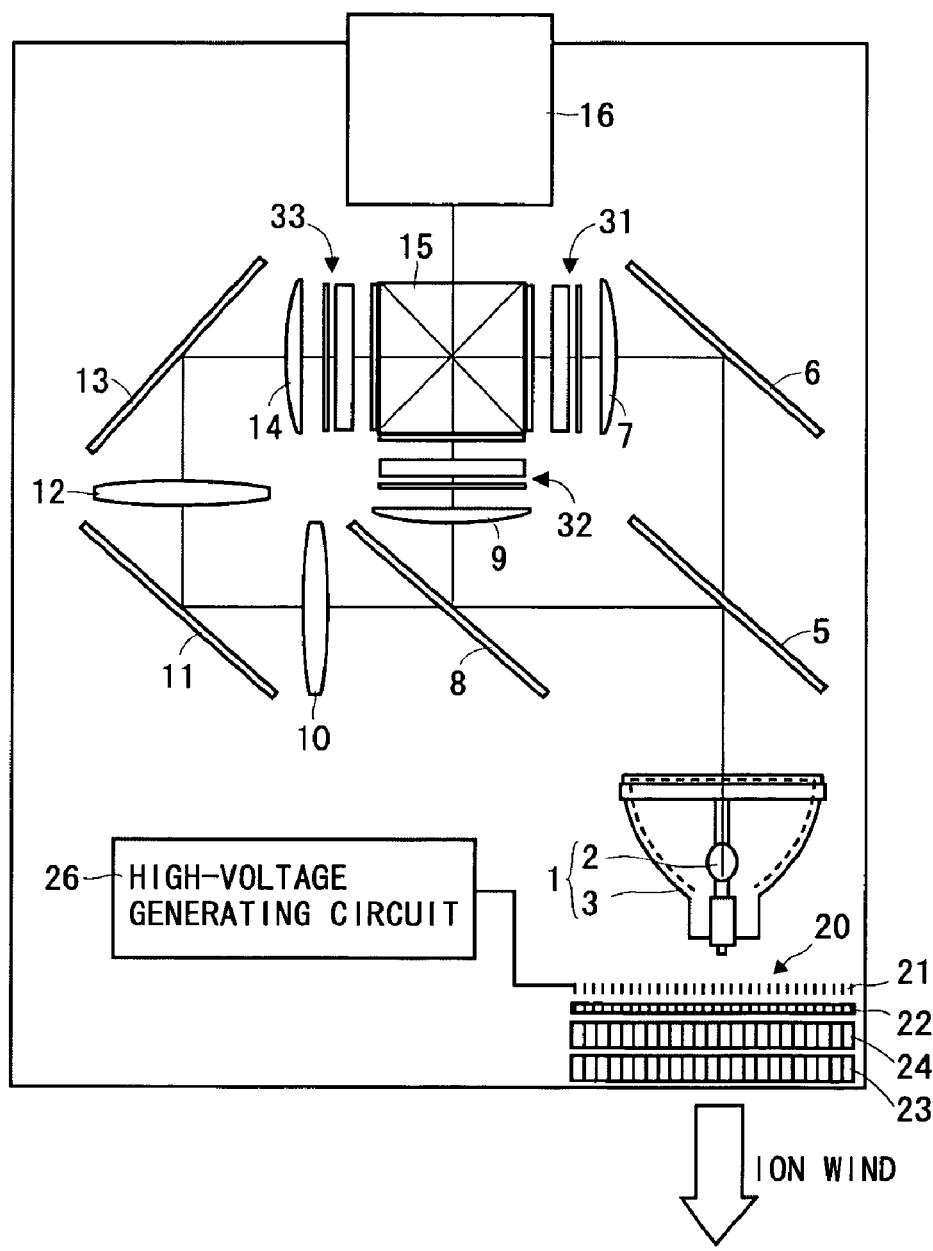
FIG. 1 is a descriptive diagram showing a projection type video display according to an embodiment of the present invention.
Figure 2:
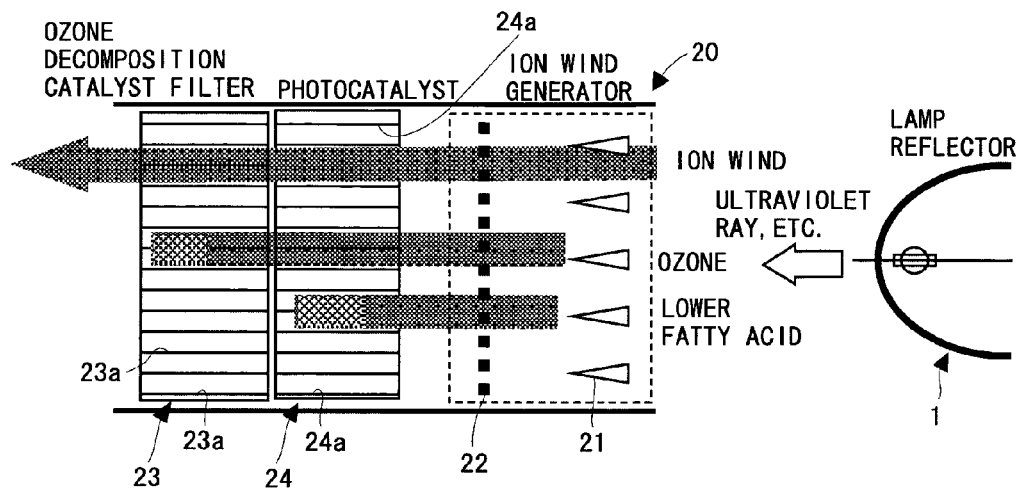
FIG. 2 is a descriptive diagram showing an ion wind generator and a peripheral structure thereof.

FIG. 1 is a diagram showing an optical system of a three-panel color liquid crystal projector. As a light emitter 2 of a light source 1, an ultra-high pressure mercury lamp, a metal halide lamp, a xenon lamp, and the like are used, and irradiated light is emitted after being changed into parallel light, for example, by a parabolic reflector 3.

A first dichroic mirror 5 transmits light in a red wavelength band, while reflecting light in a cyan (green+blue) wavelength band. The light in the red wavelength band which passes through the first dichroic mirror 5 is reflected by a reflection mirror 6 so that its optical path is changed. The red light which is reflected by the reflection mirror 6 is optically modulated by passing through a transmission type liquid crystal light valve for red light 31 through a condenser lens 7. On the other hand, the light in the cyan wavelength band which is reflected by the first dichroic mirror 5 is guided to a second dichroic mirror 8.

The second dichroic mirror 8 transmits light in a blue wavelength band, while reflecting light in a green wavelength band. The light in the green wavelength band which is reflected by the second dichroic mirror 8 is guided to a transmission type liquid crystal light valve for green light 32 through a condenser lens 9 to be optically modulated by passing the liquid crystal light valve for green light 32. In addition, the light in the blue wavelength band which passes through the second dichroic mirror 8 is guided to a transmission type liquid crystal light valve for blue light 33 through reflection mirrors 11 and 13, relay lenses 10 and 12, and a condenser lens 14, to be optically modulated by passing the liquid crystal light valve for blue light 33.

Each of the above-described liquid crystal light valves 31, 32, and 33 comprises an incidence-side polarizing plate, a panel constructed by sealing a liquid crystal between a pair of glass plates (where a pixel electrode and an alignment film are formed), and a light exit side polarizing plate. Modulated light (image light in respective colors) which have been respectively modulated by passing through the liquid crystal light valves 31, 32, 33 are combined by a dichroic prism 15, to be a color image light. The color image light is projected by a projection lens 16 and is displayed on a screen (not shown).

An ion wind generator 20 is provided at the back of the light source 1. As shown in FIG. 2, the ion wind generator 20 negatively ionizes air by corona discharges using negative-side needle electrodes 21 and draws the negatively-ionized air to a ground-side mesh electrode 22 to produce an airflow. A high-voltage generating circuit 26 receives voltage supply from a power supply (not shown) to generate a high voltage ranging from a few minus kilovolts to minus ten and several kilovolts and applies the high voltage to the electrodes 21.

Also, as shown in FIG. 1, an air supply port of the ion wind generator 20 faces an exhaust port at the back of a casing. When an airflow generated by the ion wind generator 20 is exhausted out of a casing, ambient air heated to high temperature by the heat produced by the light source 1 is drawn and exhausted out of the casing on the airflow.

A photocatalyst filter 24 is provided at the back (a downstream side of the airflow) of the ion wind generator 20. The photocatalyst filter 24 is formed by additionally attaching a photocatalyst such as a titanium oxide, and others, to a wall surface of air holes 24a in a honey-comb shape, for example. In addition, an ozone decomposition catalyst filter 23 is provided in an exhaust port at the back of the casing (at the back of the photocatalyst filter 24). The ozone decomposition catalyst filter 23 is formed by additionally attaching catalyst such as a manganese dioxide, a nickel oxide, an activated carbon, and the like, to an inner wall of air holes 23a in a honey-comb shape, for example. Ozone ($O_3$) is generated by corona discharges in the ion wind generator 20. The ozone is guided to the outside of the casing on an airflow, and the ozone is decomposed by passing through the ozone decomposition catalyst filter 23 provided in the exhaust port. Furthermore, even if a lower fatty acid is produced by undecomposed ozone, the fatty acid is removed by the photocatalyst filter 24 (the fatty acid is decomposed into alcohol and oxygen). As a result, it is possible to prevent abnormal odor by the fatty acid from being produced.

Light such as an ultraviolet ray is needed for the photocatalyst filter 24 to fully exert a decomposition performance. In the above-described configuration in which the ion wind generator 20 and the photocatalyst filter 24 are arranged at the back of the light source 1, light (ultraviolet ray, infrared ray) leaked from the light source 1 is guided to the photocatalyst filter 24. As a result, a catalyst function is well performed. Furthermore, it may be possible that, by providing a ultraviolet ray reflection mirror (transmits other visible rays) on a light-incidence side of the light source at an angle of 45 degrees to an optical axis, the ultraviolet ray is guided out of an illumination light path, and then the ultraviolet ray is guided to the photocatalyst filter 24 by a mirror.

Figure 3:
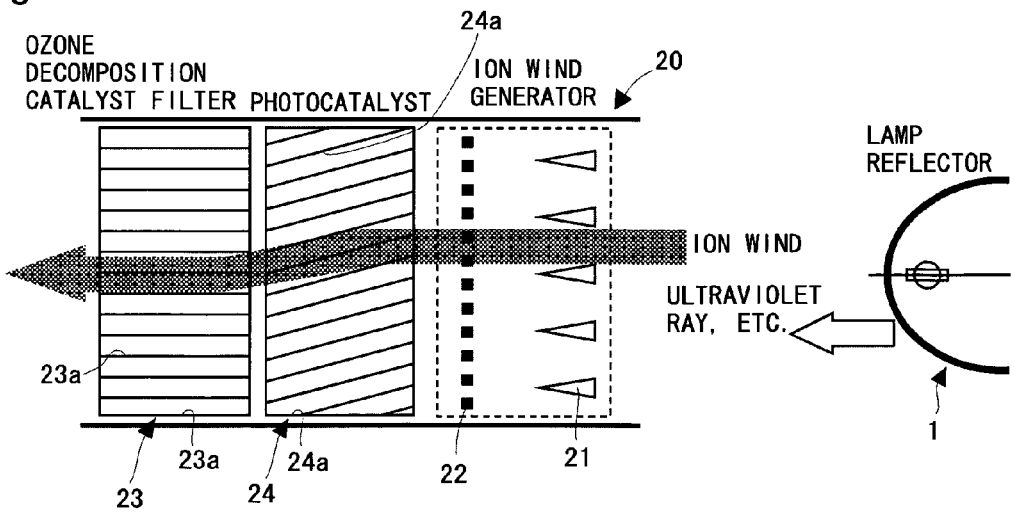
FIG. 3 is a descriptive diagram showing another example of an ion wind generator and a peripheral structure thereof.
Figure 4:
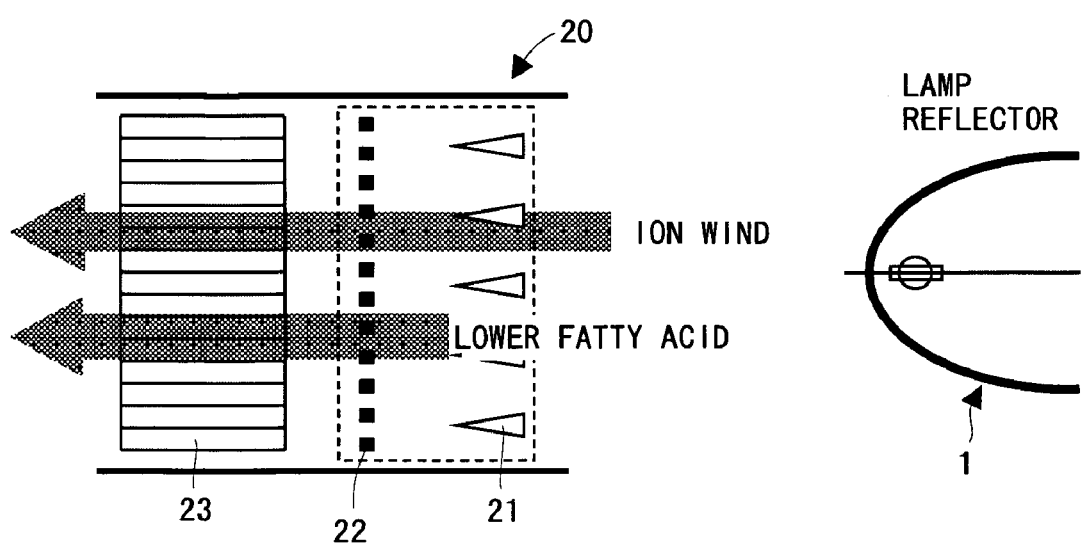
FIG. 4 is a descriptive diagram showing an ion wind generator for reference that is useful for understanding of the present invention and a peripheral structure thereof.

Furthermore, in a modified example shown in FIG. 3, the photocatalyst filter 24 is arranged such that an air suction surface and an air exhaust surface thereof are perpendicular to a advancing direction of the light leaked from the light source 1, and the air holes 24a are formed oblique to the air suction surface and the air exhaust surface. In such the configuration, the air holes 24a are rendered oblique to the advancing direction (a direction of advancing toward the exhaust port) of the light leaked from the light source 1 and the light leaked from the light source 1 contacts an inner wall surface. Since the catalyst is additionally attached to the inner wall of the air holes 24a, as a result, more amount of light contacts the catalyst, and as a result, the catalyst function is well performed. The light leaked from the light source 1 contacts the inner wall of the air holes 24a, which leads to shielding of the unnecessary light. As a result, it becomes possible to prevent the light leaked from the light source 1 from being leaked out of the exhaust port. It is noted that the shielding is made possible by slightly inclining the air holes 24a, and a flow of the ion wind is hardly obstructed, which enables to prevent a cooling power from being deteriorated.

As a configuration similar to that shown in FIG. 3, the photocatalyst filter 24 may be arranged such that the air suction surface and the air exhaust surface thereof are oblique to the advancing direction of the light leaked from the light source 1, and the air holes 24 may be formed perpendicular to the air suction surface and the air exhaust surface.

In the above-described example, the high-temperature air surrounding the light source 1 is taken in using the ion wind generated by the ion wind generator 20, and guided to the outside of the casing. However, the ion wind generated by the ion wind generator 20 may be blown onto the light source 1. In this case, it is preferable that the ozone decomposition catalyst filter 23 is arranged in the close vicinity of a reflector 3 of the light source 1. In addition, a positive-negative relationship between an electrode on one side and an electrode on the other side in the ion wind generator may be reversed. Furthermore, as far as the ion wind generator is so constructed that the airflow is generated by ionization of air or molecules in the air, the ion wind generator different from the above-described specific structure may be used. Moreover, it may be possible to adopt one filter having both functions of the photocatalyst filter 24 and the ozone decomposition catalyst filter 23. Such the filter is obtained by attaching a catalyst for removing the lower fatty acid and an ozone removal element in such a manner as to be being mixed or divided into areas to an inner wall of vent portions of a filter body. In addition, an arranging order of the photocatalyst filter 24 and the ozone decomposition catalyst filter 23 is not limited to that shown in the FIG. 2 and FIG. 3.

In the above-mentioned example, a video generating optical system using three transmission-type liquid crystal display panels is shown. However, the present invention is not limited to such video generating optical system, and the present invention is adaptable to a case that another image generating optical system is used.

The present invention has such advantages that the ion wind generator is used as a cooling device and the abnormal odor caused by the generation of the lower fatty acid can be minimized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that modulates light emitted from a light source by a light valve and projects the modulated light, comprising:

a wind blower for generating an airflow by ionizing air and molecules in the air by an electrode on one side and drawing ions generated by an ionization by an electrode on the other side; and a catalyst filter provided at a back of the wind blower, at a downstream side of the airflow, for removing, by having a plurality of vent portions, a lower fatty acid in the airflow that passes through the vent portions; the light from the light source being guided to the catalyst filter.

2. A projection type video display according to claim 1, wherein said wind blower and said catalyst filter are arranged at the back of said light source.

3. A projection type video display according to claim 2, wherein said catalyst filter is arranged such that the vent portions thereof are oblique to a direction of light that leaks from a rear side of said light source and advances to an exhaust port or a suction port.

4. A projection type video display according to claim 3, wherein said catalyst filter is formed such that a catalyst for removing the lower fatty acid, and an ozone removal element are attached, by being mixed or being divided into areas, to an inner wall of the vent portions of a filter body.

5. A projection type video display according to claim 3, comprising an ozone removal filter, and said ozone removal filter being arranged at the back of said catalyst filter arranged at the back of said light source.

6. A projection type video display according to claim 2, wherein said catalyst filter is formed such that a catalyst for removing the lower fatty acid, and an ozone removal element are attached, by being mixed or being divided into areas, to an inner wall of the vent portions of a filter body.

7. A projection type video display according to claim 2, comprising an ozone removal filter, and said ozone removal filter being arranged at the back of said catalyst filter arranged at the back of said light source.

8. A projection type video display according to claim 1, wherein said catalyst filter is formed such that a catalyst for removing the lower fatty acid, and an ozone removal element are attached, by being mixed or being divided into areas, to an inner wall of the vent portions of a filter body.

9. A projection type video display according to any one of claims 1 to 5, wherein said catalyst filter is a photocatalyst filter.

* * * * *